United States Patent
Do et al.

(10) Patent No.: US 8,330,912 B2
(45) Date of Patent: Dec. 11, 2012

(54) DISPLAY APPARATUS PROVIDING SIDE VIEW LUMINANCE ENHANCEMENT

(75) Inventors: Hee-Wook Do, Cheonan-si (KR);
Ki-Chul Shin, Asan-si (KR);
Kwang-Hyun Kim, Guri-si (KR);
Ji-Hoon Kim, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 402 days.

(21) Appl. No.: 12/726,056

(22) Filed: Mar. 17, 2010

(65) Prior Publication Data

US 2011/0043730 A1    Feb. 24, 2011

(30) Foreign Application Priority Data

Aug. 18, 2009 (KR) .................. 10-2009-0076404

(51) Int. Cl.
*G02F 1/1335* (2006.01)
(52) U.S. Cl. ........................................ 349/117
(58) Field of Classification Search .................. 349/117
See application file for complete search history.

(56) References Cited

U.S. PATENT DOCUMENTS

| | | | |
|---|---|---|---|
| 2006/0221286 A1 | 10/2006 | Allen et al. | |
| 2008/0239490 A1 | 10/2008 | Hong et al. | |
| 2010/0206478 A1* | 8/2010 | Fujita et al. | 156/324 |

FOREIGN PATENT DOCUMENTS

| | | |
|---|---|---|
| JP | 2006286192 A | 10/2006 |
| JP | 2007328342 A | 12/2007 |
| JP | 2008249915 A | 10/2008 |
| KR | 1020040056969 A | 7/2004 |
| KR | 1020050073077 A | 7/2005 |
| KR | 1020060099468 A | 9/2006 |
| KR | 1020060128731 A | 12/2006 |
| KR | 1020080047689 A | 6/2008 |
| KR | 1020080068268 A | 7/2008 |

* cited by examiner

*Primary Examiner* — Phu Vu
(74) *Attorney, Agent, or Firm* — Innovation Counsel LLP

(57) ABSTRACT

A flat panel display device is provided with an increased viewing angle having good dark versus light imaging contrast. The display device includes a display panel, a first optical unit, and a second optical unit. The display panel includes a liquid crystal layer that is driven in a vertical alignment mode. The first optical unit includes a negative C-plate and a first polarizer having a first absorption axis. The second optical unit includes a biaxial compensation plate having a refractive indices coefficient, (nx−nz)/(nx−ny) of more than 0.45 and less than 0.55, and a second polarizer having a second absorption axis crossing the first absorption axis. The biaxial compensation plate has a refractive indices relationship of nx>nz>ny such that dispersion of polarization states of colored light rays passed through the C-plate and the liquid crystal layer may be minimized and gathered about an extinction point, thereby improving contrast at side viewing angles.

18 Claims, 14 Drawing Sheets

DISPLAY APPARATUS PROVIDING SIDE VIEW LUMINANCE ENHANCEMENT

CROSS-REFERENCE TO RELATED APPLICATION

This application claims priority to and the benefit of Korean Patent Application No. 10-2009-0076404 filed in the Korean Intellectual Property Office on Aug. 18, 2009, the entire contents of which application are incorporated herein by reference.

BACKGROUND (a) Field of Disclosure

The present disclosure of invention relates to display devices. More particularly, the present disclosure relates to a liquid crystal display (LCD) capable of displaying images at different viewing angles by using light transmittance through a polarizing liquid crystal material layer.

(b) Description of Related Technology

A typical liquid crystal display includes a liquid crystal panel displaying images by using light provided from a backlighting assembly disposed under the liquid crystal panel where the provided light is polarized in one direction when provided from underneath toward and through the liquid crystal panel and where the liquid crystal panel can modify the polarization of the light and thereby modulate the passed through luminance.

The liquid crystal panel includes a first substrate having a plurality of thin film transistors (TFT's) each coupled to a respective pixel electrode, a second substrate spaced apart from but facing the first substrate and having a common electrode thereon, and a light-polarizing liquid crystal material layer interposed between the first substrate and the second substrate.

The liquid crystals in the liquid crystal layer may be structured to operate in a vertical alignment mode (VAM). Their light polarizing effects may be modulated by use of an electric field formed between a given pixel electrode (of a given pixel) and the correspondingly spaced apart portion of the common electrode. For example, if an electric field is not generated between the pixel electrode and the common electrode (a zero field magnitude), the VAM liquid crystal location may appear as a black image (maximally darkened pixel) due to the way that polarized light is processed by various layers of the LCD panel including by the VAM liquid crystal layer. On the other hand, when an electric field of nonzero and varying magnitude is generated between the pixel electrode and the common electrode, images of several corresponding grays may be presented to a viewer who is facing the screen square on (so that viewed light rays leave the screen at right angles to the screen surface).

When increasing magnitudes of electric field intensity are generated between the pixel electrode and the common electrode, corresponding images that are gradually brighter and brighter are realized. This occurs because the VAM liquid crystals in the liquid crystal layer are becoming aligned to be more parallel to the substrates and their VA mode of operation then lets more and more light through (due to polarization effects) as the angles of the crystals with respect to the pixel electrode or the common electrode shift further and further away from the fully relaxed 90 degrees. On the other hand, when the VAM liquid crystals are arranged in the vertical direction (to be relaxed at 90 degrees relative to the substrate surfaces), an excellent black image having relatively low luminance is displayed to a person viewing the front side of the liquid crystal panel head on (so that viewed light rays emerge from the panel at 90 degree angles relative to the substrate surfaces). However, for a person viewing the front side of the liquid crystal panel at an angle (from a side of the display rather than head on), the pixels which are supposed to have a maximally black imagery instead appear with undesirably higher luminances (e.g., gray rather than black). This happens because the light rays progressing towards the side view direction of the liquid crystal panel pass obliquely rather than square on through the liquid crystal material layer and these obliquely passing through light rays experience a larger phase retardation effect (R, which may be measured in nanometers) resulting from the greater thickness of, and the differently tilted relative angles of the liquid crystals the light rays pass through as compared to the light rays that progress normally in the head-on, front direction of the panel through the liquid crystal material layer.

As described above, in the liquid crystal panel that is operated in the conventional vertical alignment mode (VAM) and having no compensation for oblique light rays, the side-viewed luminances of pixels that are supposed to be fully black image are observed to be higher than desired and the brightness contrast ratio is thus decreased for persons viewing the panel from a side angle rather than head-on.

The above information disclosed in this Background section is only for enhancement of understanding of the background and of the technology of what is disclosed here and therefore the Background information it may contain information that does not form part of the prior art that is already known to persons of ordinary skill in the pertinent art.

SUMMARY

The present disclosure of provides an LCD panel in which the side contrast ratio of a vertical alignment mode (VAM) display is improved.

A display device according to exemplary embodiments of the present disclosure includes a display panel sandwiched between a first optical unit and a second optical unit, where the first and second optical units apply different optical processing effects to the polarizations of light rays passing obliquely through them so as to increase extinction of passed through luminance when the intended output is a solid black. More specifically, one of the optical units includes a so-called, negative polarization rotation C-plate whose refractive indices, $n_x$, $n_y$, $n_z$ in corresponding orthogonal vector directions x, y and z are not all equal; and more particularly where the $n_z$ refractive index value is of smaller magnitude than each of the $n_x$ and $n_y$ refractive indices so that obliquely directed light rays are refracted to a greater extent than light rays passing perpendicularly through and the normally directed light rays experience a, relativistically speaking, negative phase retardation effect. The effect is designed so as to be countered by a positive phase rotation effect imparted on the normal light rays when they next pass through the VAM liquid crystal layer.

In terms of more detail, the display panel includes a first substrate (e.g., TFT substrate) and a spaced apart second substrate (e.g., common electrode substrate) facing the first substrate where a liquid crystal material layer is interposed between the first substrate and the second substrate and is operable in a vertical alignment mode (VAM). In one embodiment, the first optical unit includes the aforementioned, negative C-plate as well as a first polarizer film where the first polarizer film has a corresponding first absorption axis (AA) extending in the plane of the first polarizer film. The second optical unit includes a biaxial compensation film having a refractive indices characteristic whose Nz coefficient value is $(n_x-n_z)/(n_x-n_y)$ and the Nz coefficient is more than about 0.45 but less than 0.55. The second optical unit further includes a second polarizer film having a corresponding second, in-plane absorption axis (AA) that is at right angles to the first absorption axis (AA) so that the combination of the first and second polarizers substantially block normal light passage when the VAM liquid crystal layer is in a relaxed mode (no twisting electric field applied) and a good black image is produced at least for non-oblique light rays (normal rays).

The first optical unit may be disposed underneath the display panel so that white light provided from the backlight unit progresses first through the first optical unit and then through the liquid crystal panel. The second optical unit may be disposed at a position above the liquid crystal display panel with respect to the progressing direction of the backlight provided light. Alternatively, positions of the first and second optical units may be swapped.

The aforementioned C-plate may be disposed between the display panel and the first polarizer, while a biaxial compensation plate is disposed between the display panel and the second polarizer.

The biaxial compensation plate is structured so that its orthogonally vectored refractive indices are different from one another and such that the axis (SA) meaning the one having the greatest or strongest refractive index among nx and ny, and nz, extends at substantially right angles to one of the first and second absorption axes (AA). Here, nx is the refractive index of the x-axis direction, ny is the refractive index of the y-axis direction crossing the x-axis direction, and nz is the refractive index of the direction vertical to the surface formed by the x-axis and the y-axis.

In one embodiment, the biaxial compensation plate may by microstructured to fulfill the inequality condition of: nx≠ny≠nz, and more particularly: nx>nz>ny. Additionally, the biaxial compensation plate should be a lateral phase retardation plate where in one embodiment, its surface-parallel differential phase retardation value Ro is more than 270 nm and less than 280 nm. Here, Ro=(nx−ny)*d, where d is the thickness of the film.

The biaxial compensation plate is designed to have phase retardation dimension of about half a wavelength of the central wavelength (e.g., Green) among the visible wavelengths passed by the color filters (e.g., R, G, B) of the LCD panel. This Ro value is picked to cause translation of a polarization state in a Poincare' Sphere to a position in symmetry with respect to the origin of the Poincare sphere so that extinction is achieved when the VAM liquid crystal are relaxed, as will be detailed below.

The absolute value of the surface-normal phase retardation value, Rth (taken in the thickness direction of the negative C-plate (Nega CP) may be less than the absolute value of the phase retardation of the thickness direction Rth of the liquid crystal layer. Here, Rth={(nx+ny)/2−nz}*d, where d is the thickness of the film or the layer.

The biaxial compensation plate may be designed to substantially provide compensatingly-shifted polarization states for red light, green light, and blue light dispersed by the C-plate and by the liquid crystal layer when observing the display panel at a nominal side view, where the biaxial compensation shifts the R, G and B polarization states into an extinction point on the front surface of a Poincare sphere.

In accordance with the present disclosure, the second optical unit may include the biaxial compensation plate and its affect on obliquely passed light rays may be such that the bright contrast ratio is improved when observing at a nominal side view position of the display device. That is, the biaxial compensation film may operate to gather and re-coordinate polarization states of the red light, green light, and blue light rays that had been dispersed by the C-plate and by the VAM liquid crystal layer so that the re-gathered polarization states merge towards the extinction point on the surface of the Poincare sphere Accordingly, the bright contrast ratio of oblique light rays may be prevented from being decreased by the dispersion of the polarization state of the colored lights.

BRIEF DESCRIPTION OF THE DRAWINGS

FIG. 4 is a perspective view of a Poincare Sphere that is useful for explaining what happens to the polarization states of light rays as they progress through the optical members of the embodiments of FIG. 2 and FIG. 3.

DETAILED DESCRIPTION

Figure 1:
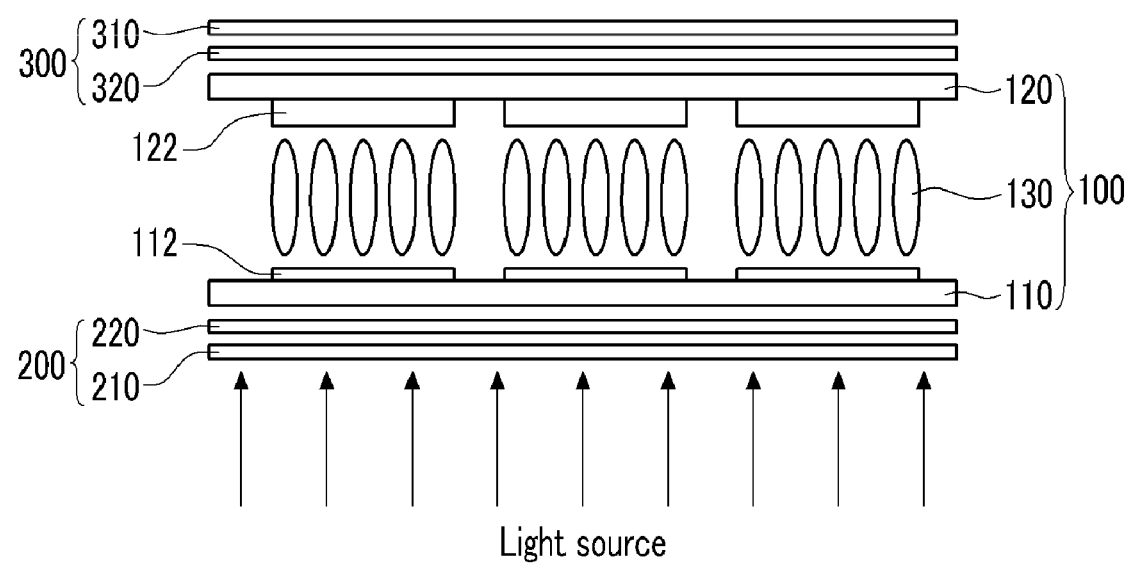
FIG. 1 is cross-sectional view of a display device according to an exemplary embodiment of the present disclosure.

The present disclosure of invention will be described in greater detail hereinafter with reference to the accompanying drawings, in which exemplary embodiments are shown.

The present disclosure may be modified in various manners with several formats. Nonlimiting specific exemplary embodiments are illustrated in the drawings and described in detail in the specification. It is to be understood that the invention is not limited to the disclosed embodiments, but is intended to cover various modifications, equivalent arrangements or alternatives included within the spirit and scope of the present teachings.

Like reference numerals designate like elements in the descriptions related to the respective drawings. In the appended drawings, the dimensions of the structural components may be exaggerated for clarity.

Although the terms "first", "second," etc., may be used to describe various structural components, they are not intended to limit those components. Such terms are used only for discriminating one of the structural components from another element. For example, the first structural component may be called the second structural component, and similarly, the second structural component may be called the first structural component. Unless meant to be different contextually and explicitly, singular expressions may include plural expressions.

It should be understood in this application that the term "comprise" or "have" implies the inclusion of features, numbers, steps, movements, structural components, parts, or combinations thereof mentioned in the specification, but not the exclusion of one or more of any other features, numbers, steps, movements, structural components, parts, or combinations thereof.

Furthermore, unless defined differently, all the terms used herein, including technical or scientific terms, have the same meanings as those generally understood by a person of ordinary skill in the pertinent art. The terms defined in the general dictionaries should be interpreted as having the meanings agreeing to the contextual meanings in the art, and unless defined explicitly in the present application, are not interpreted as having ideally or overly formal meanings.

FIG. 1 is a cross-sectional view of a display device according to an exemplary first embodiment.

Figure 2:
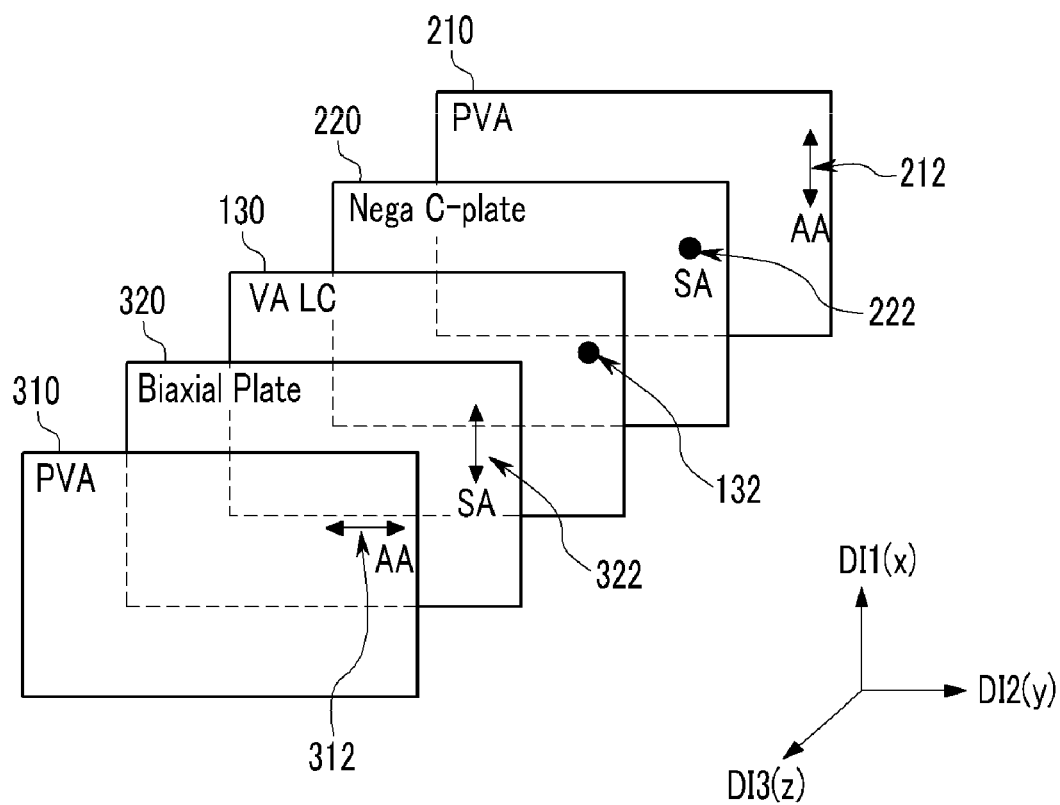
FIG. 2 and FIG. 3 are exploded assembly views for showing a concept of a polarization changing relationship of stacked optical members of the display device shown in FIG. 1.
Figure 3:
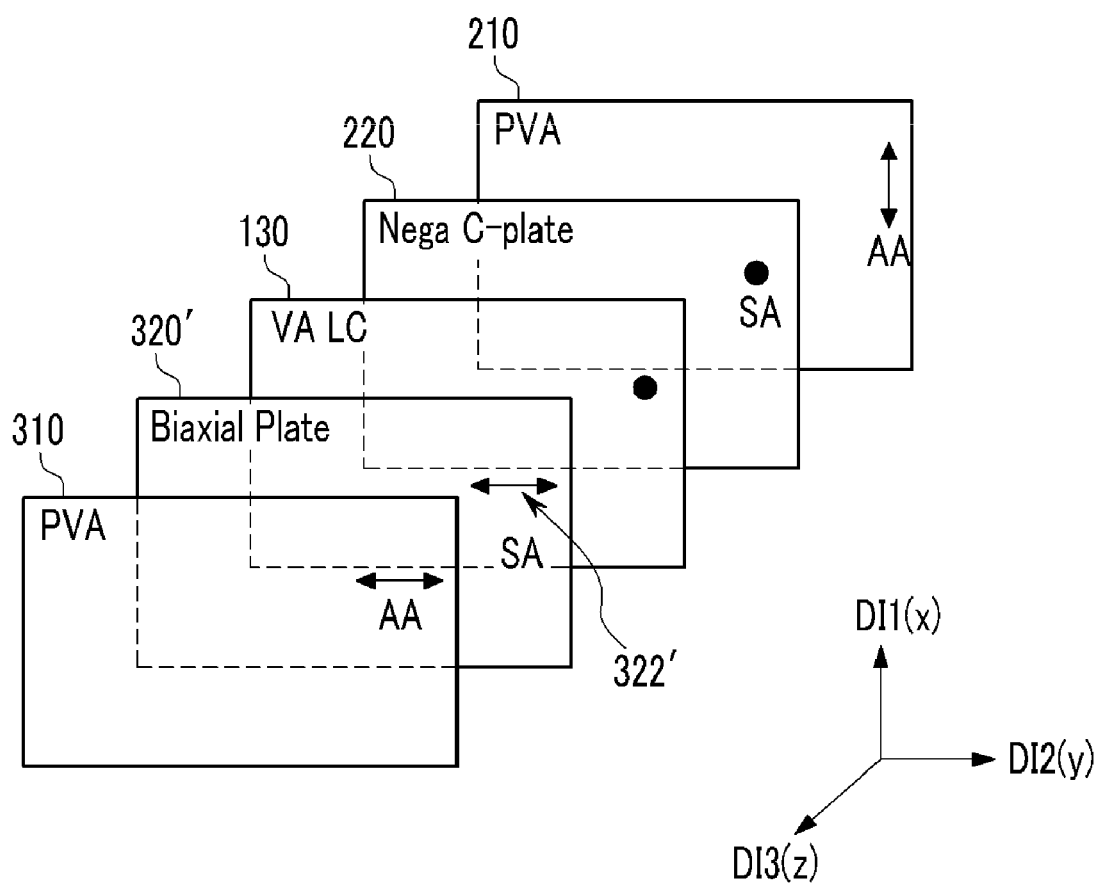

Referring to FIG. 1, FIG. 2, and FIG. 3, a display device according to the present exemplary embodiment includes a display panel 100, a first optical unit 200, and a second optical unit 300.

The display panel 100 includes a first transparent substrate 110 (e.g., glass or plastic), a second transparent substrate 120 facing the first substrate 110, and a liquid crystal layer 130 interposed between the first substrate 110 and the second substrate 120.

The first substrate 110 includes signal lines (e.g., gate and data lines, not shown), thin film transistors (not shown) electrically connected to the signal lines, and pixel electrodes 112 electrically connected to the thin film transistors. The pixel electrodes 112 are made of a transparent conductive material (e.g., ITO, IZO), and receive data voltages transmitted from the signal lines (from the data lines) through the thin film transistors.

The second substrate 120 includes respective color filters 122 (e.g., R, G or B) facing corresponding ones of the pixel electrodes 112, and a transparent and conductive common electrode (not explicitly shown) formed on the second substrate to conformably extend for example under the respective color filters 122. The color filters 122 may include a red color filter, a green color filter, and a blue color filter. As mentioned, the common electrode is made of a transparent conductive material, and receives a common voltage.

The liquid crystal layer 130 is disposed between the first substrate 110 and the second substrate 120, and may be driven in a vertical alignment mode (VAM). That is, if an electric field is not generated between the pixel electrode 112 and the counter-facing portion of the common electrode, the liquid crystals of the liquid crystal layer 130 are arranged vertically relative to the surface of the first substrate 110, and if the electric field is formed between the pixel electrode 112 and the common electrode, the liquid crystals of the liquid crystal layer 130 become inclined with respect to the surface of the first substrate 110. The inclination angle is increased as the intensity of the electric field is increased, and the liquid crystals become arranged more parallel to the surface of the first substrate 110 as the electric field intensity is increased. When they are inclined relative to the light rays passing through them, the VAM liquid crystals impart a different polarization effect to the light rays than they impart when the liquid crystals are relaxed (not strained by the electric field).

The first optical unit 200 is disposed under the display panel 100. The first optical unit 200 includes a first polarizer film 210 disposed under the display panel 100, and a C-plate 220 disposed between the first polarizer 210 and the first optical unit 200. Given the illustrated stacking of optical layers, it should be apparent that light emitted from a light source disposed under the first polarizer 210 passes (progresses) through the first polarizer 210 and then through the C-plate 220 before becoming incident upon the display panel 100.

The second optical unit 300 is disposed above the display panel 100. The second optical unit 300 includes a second polarizer 310 disposed on the display panel 100, and a biaxial compensation plate 320 disposed between the second polarizer 310 and the display panel 100.

The backlight provided rays that pass through and emerge from the display panel 100 are sequentially transmitted through the biaxial compensation plate 320 and then through the second polarizer 310.

In an alternate embodiment, the positions of the first optical unit 200 and the second optical unit 300 may be exchanged. That is, the second optical unit 300 may be disposed under the display panel 100, and the first optical unit 200 may be disposed on top of the display panel 100.

FIG. 2 is an exploded perspective assembly view showing a concept of relationships between the stacked optical members of the display device shown in FIG. 1.

Firstly, the first polarizer 210 at the back of the illustrated stack has a first absorption axis (AA) 212 oriented parallel to the first direction DI1 of an illustrated, three dimensional reference frame, DI1, DI2, DI3. The first polarizer 210 also has a first transmissive axis (not shown) parallel to the second direction DI2, in other words, crossing at right angles with the first direction DI1 in the plane of the first polarizer 210. That is, the light transmitted from the backlight unit and through the first polarizer 210 becomes substantially polarized in the second direction DI2 (the transmissive axis, not shown) and thus achieves a first linearized polarization state. Here, the third direction DI3 as a direction crossing the first and second directions DI1 and DI2, and the third direction DI3 is the primary progressing direction of normal light rays among the backlight supplied light. (But of course, light rays progressing at slightly off-normal angles are also considered herein.)

The C-plate 220 disposed in terms of light progression on top of the first polarizer 210 has an optical axis 222 parallel to the third direction Di3 (represented as a dot). The C-plate 220 may be a negative polarization rotation C-plate, meaning that it is micro-structured to satisfy the refractive indices equation and inequality of: $n_x = n_y > n_z$. Here, $n_x$ is a refractive index of a x-axis direction, $n_y$ is a refractive index of a y-axis direction crossing the x-axis direction, and $n_z$ is a refractive index of a z-axis direction where the latter is crossing orthogonally with the orthogonal x-axis and y-axis directions. In the present exemplary embodiment, the x-axis direction may be parallel to the first direction DI1, the y-axis direction may be parallel to the second direction DI2, and the z-axis direction may be parallel to the third direction DI3.

A surface-parallel phase retardation, $R_o$ provided by the major surface of the C-plate 220 has a zero value because of the vectored refractive indices equality relation, $n_x = n_y$. More specifically, the surface-parallel phase retardation $R_o$ of the C-plate 220 is $(n_x - n_y) \cdot d$, where d is the thickness of the C-plate 220. But since nx=ny essentially holds true, Ro is essentially zero for light rays (normal and oblique) passing through the C-plate 220.

The surface-normal phase retardation Rth in the thickness direction of the C-plate 220 is also controlled by the relation, nx=ny>nz, and as a result, the Rth of the C-plate 220 has a positive value. Here, the surface-normal phase retardation Rth of the thickness direction of the C-plate 220 is set forth as:

$$Rth=\{(n_x+n_y)/2-n_z\}*d.$$

The liquid crystal layer 130 is disposed next in line after the C-plate 220. The liquid crystals of the liquid crystal layer 130 are driven in the vertical alignment (VA) mode, and may have a refractive index relationship substantially opposing that of the C-plate 220. The liquid crystal layer 130 may have an optical axis 132 parallel to the third direction. The optical axis 132 of the liquid crystal layer 130 may be formed to create an nz versus nx relationship pointing in the opposite direction of the optical axis 222 of the C-plate 220. For example, the liquid crystal layer 130 may have a vectored refractive indices characteristic satisfying the equation of $n_x=n_y<n_z$.

The surface-parallel phase retardation factor, Ro in the surface of the liquid crystal layer 130 is controlled by the indices relationship, nx=ny, thereby causing Ro to have a zero value in the liquid crystal layer 130. The surface-normal phase retardation Rth of the thickness direction of the liquid crystal layer 130 is controlled by the indices relationship, nx=ny<nz, thereby having a negative $n_x-n_z$ value. More specifically, the surface-normal phase retardation Rth of the thickness direction of the liquid crystal layer 130 is expressed as: $\{(n_x+n_y)/2-n_z\}*d$, where d is the thickness of the liquid crystal layer 130. (Note the d thickness of the liquid crystal layer 130 is not necessarily the same as the d thickness of the C-plate 220 and thus d is understood to be measured as a context sensitive parameter for each optical layer.)

In an alternate embodiment, the absolute value of the surface-normal phase retardation Rth of the thickness direction of the C-plate 220 may be less than the surface-normal phase retardation Rth of the thickness direction of the liquid crystal layer 130. For example, the phase retardation Rth of the thickness direction of the C-plate 220 may be about +225 nm (nanometers) with reference to 550 nm green light, and the phase retardation Rth of the thickness direction of the liquid crystal layer 130 may be about −277 nm with reference to the 550 nm green light when the liquid crystals are aligned vertically (relaxed).

The color filter 122 is disposed in the illustrated stack (FIG. 2) in front of the liquid crystal layer 130, and it changes (e.g., by means of selective spectral absorption) transmitted white colored light rays into respectively colored light rays, for example, the red light (R), the green light (G), or the blue light (B). That is, in one embodiment, each of the color filters 122 primarily transmits one of the red light, the green light, and the blue light of the white colored light wavelengths that were supplied to it including the red light, the green light, and the blue light wavelengths while substantially absorbing the untransmitted wavelengths in accordance with the absorption band pass characteristics of the respective color filter.

The biaxial compensation plate 320 of FIG. 2 is disposed in front of the color filter 122, and has an optical axis 322 (SA) extending parallel to the first direction DI1. In the alternate embodiment of FIG. 3, the biaxial compensation film 320 of FIG. 3 is disposed on the color filter 122, and has an optical axis 332' extending parallel to the second direction DI2. In other words, the slow optical axis 322/322' (SA) of the biaxial compensation film 320 is at right angles to at least one of absorption axes (212, 312) of respective polarization films 210 and 310.

The biaxial compensation plate 320 may be microstructured to satisfy the vectored refractive indices relation of:

$$n_x \neq n_y \neq n_z,$$

and more particularly in FIG. 2:

$$nx>nz>ny.$$

(Alternatively in FIG. 3, the relation is: ny>nz>nx.)
As a result, the surface-parallel phase retardation factor, Ro in the surface of the biaxial compensation plate 320 is about 270 nm or more with reference to a 550 nm green light center, and may in one embodiment, have phase retardation of less than about 280 nm. In other words, roughly half a wavelength relative to the central color filters wavelength (Green in this example). Here, the surface-parallel phase retardation Ro in the surface of the biaxial compensation film 320 is (nx−ny) *d, where d is the thickness of the biaxial compensation film 320.

Since the biaxial compensation plate 320 is designed to have the phase retardation of about half a wavelength with respect to the central wavelength (e.g., 550 nm Green) of the filter passed through visible wavelengths, the change of polarization states sends the passed through light rays into respective polarization states that are symmetrically opposite relative to the prime meridian in a Poincare sphere (FIG. 4) of their states when entering the lower panel. In other words, they are shifted into close proximity with their extinction point.

Also, the Nz coefficient of the biaxial compensation plate 320 may be such that the phase retardation ratio of the film, $(n_x-n_z)/(n_x-n_y)$ is more than 0.45 and less than 0.55. Here, the Nz coefficient of the biaxial compensation film 320 means the ratio: (nx−nz)/(nx−ny).

In accordance with the present disclosure, the Nz value of the biaxial compensation film 320 should be designed near 0.5 to thereby send polarization states of light rays entering from the backlight unit and passing through the VAM liquid crystal layer (when in relaxed mode) to coordinate positions on the Poincare' Sphere that are symmetrically opposite with respect to the origin point in the Poincare sphere to their entry states. In other words, they are shifted into or substantially close to their extinction states. If the Nz value is more than 0.55, the final state point will remain on the right side of the prime meridian (right of the S3 paralleling longitude line of FIG. 5) such that the final polarization state coordinate is too far away from extinction point (diamond in FIG. 4) to effectively cause extinction, and if it is less than 0.45, the final state point will be moved more to the left relative to the origin point such that the final polarization state coordinate is again too far away from the extinction point.

The second polarizer 310 is disposed in front of the biaxial compensation plate 320 as shown in FIG. 2, and has a respective second absorption axis 312 (AA2) parallel to the second direction DI2 and a second transmissive axis (not shown) parallel to the first direction DI1.

The nx axis of the biaxial compensation plate 320 is orthogonally crossed with the second transmissive axis (not shown) of the second polarizer 310.

Figure 4:
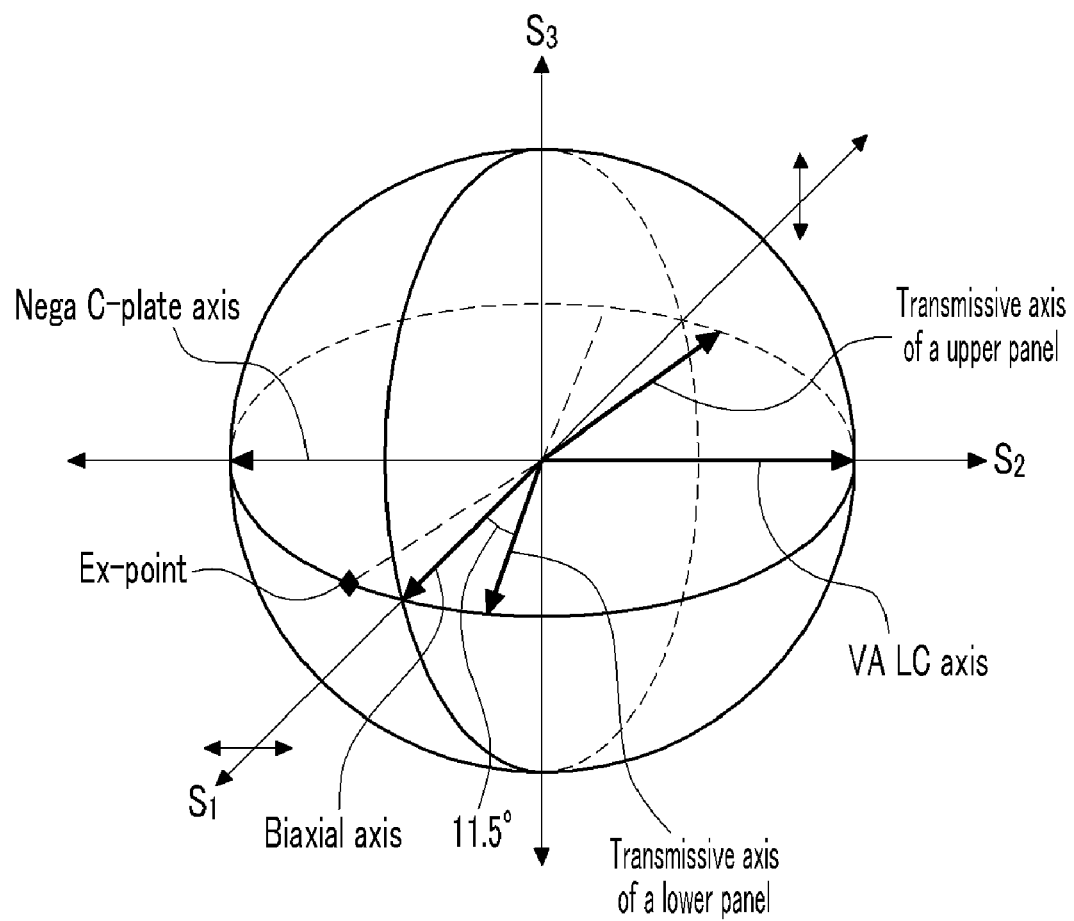
FIG. 4 is a view of a Poincare sphere representing a relationship between absorption axes (AA) and optical axes of optical members shown in FIG. 2 and FIG. 3 and also

FIG. 4 is a view showing a Poincare sphere representing a relationship between the absorption axes (AA's) and the optical axes of the optical members of FIG. 2 and FIG. 3. As known to those skilled in the art of light polarization, a Poincare sphere is a useful tool for explaining how the polarization states of light rays shift from one kind to another, including as between various linear polarization angles (represented around the equator of the sphere) and various circular polarization direction (right circulating or left circulating, and as represented around the north and south poles of the sphere).

Referring to FIG. 4, the Poincare sphere is drawn relative to three coordinate axes, that is, a first coordinate-axis S1, a second coordinate-axis S2, and a third coordinate-axis S3. The Poincare sphere stereoscopically helps to explain the polarization state of progressing light rays as they progress through the various stacked optical layers of the display device.

As used here, a nominal side view of the display device is a side view when viewing the display device with an azimuth angle of 45 degrees and a polar angle of 60 degrees.

The optical axis of the relaxed liquid crystal layer 130, that is, its polarization rotation axis, is formed in the positive direction of the second coordinate-axis S2. On the other hand, the optical axis of the C-plate 220, that is, its polarization rotation axis, is formed in the opposite direction of the second coordinate-axis S2. If the rotation magnitudes of these oppositely pointing, polarization rotation vectors are made to be approximately equal to one another, the net effect will be to shift the polarization states of through-transmitted light rays to a point on the equator of the sphere, which point is near the prime meridian where the S1 axis emerges. (Actually the resultant polarization state is slightly to the right of where S1 emerges from the equator in FIG. 4 and in one embodiment, about 11.5 degrees to the right.)

The first transmissive axis of the first polarizer 210, that is, the transmissive axis of the lower panel, may be represented as a vector lying on the plane formed by the first and the second coordinates, S1 and S2, where that transmissive vector is inclined to the right side of the S1 axis in FIG. 4 by an angle of about 11.5 degrees.

The optical axis of the biaxial compensation plate 320 may be represented as a vector also lying on the plane formed by the first and second coordinates S1 and S2, and disposed colinear with the first coordinate-axis S1.

On the other hand, the extinction point (diamond shaped icon) on the surface of the Poincare sphere is disposed on its equator and at a position to the left of the S1 vector, where the leftward disposition angle of the extinction point (Ex-point) is symmetrically opposite to that (11.5 degrees) of the transmissive axis of the lower panel. The extinction point is a position representing an ideal self-extinguishing polarization state of light rays that have progressed in their transmission all the way from the first polarizer 210 in the lower optical unit to and through the biaxial compensation film 320 of the upper optical unit. That is, when the light rays are transmitted from the first polarizer 210, and through the relaxed VAM LCD layer and to and through the biaxial compensation film 320 so that their final polarization states are in accord with or substantially near to the extinction point, their luminances are automatically self-extinguished, and as a result a strong dark pixel is created and the brightness contrast ratio CR when observing from the nominal side view of the display device is essentially maximized.

Figure 5:
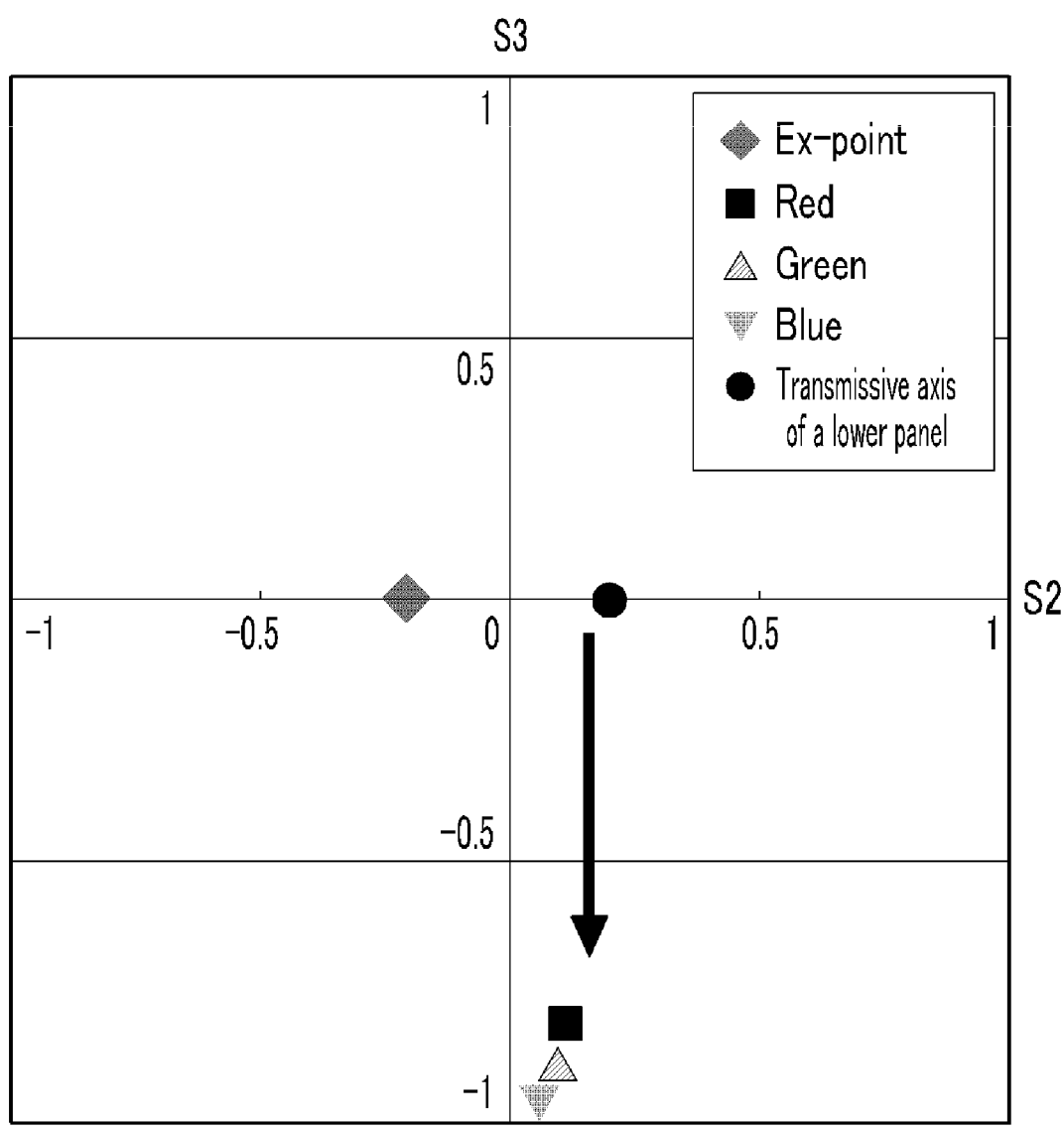
FIG. 5 is a plan view of the front spherical surface of the Poincare sphere showing what happens to polarization states after colored light rays pass through the negative C-plate of FIG. 2.

FIG. 5 is a front plan and flattened view of the spherical surface of the Poincare sphere when looking head on into the S1 vector and it is provided for explaining in more detail how the respective polarization states of differently colored light rays (R, G and B) are changed after transmitting through the C-plate of FIG. 2 or FIG. 3.

Referring to FIG. 2, FIG. 3, FIG. 4, and FIG. 5, the Poincare surface shown in FIG. 5 has coordinates representing the polarization state on the Poincare sphere when observing it head on while facing the forward emerging first coordinate-axis S1. That is, the illustrated mapping of the Poincare front surface has the second coordinate-axis S2 aligned directly behind the Equator and has the third coordinate-axis S3 aligned directly behind the prime meridian.

Firstly in FIG. 5, the polarization states of red light, green light, and blue light as passed only through the first linear polarizer 210 are formed on the Equator at the circle spot (transmissive axis of lower panel) just to the right (e.g., by about 11.5 degrees) of the prime meridian. In other words, because the transmissive axis of the first polarizer 210 is in the y direction (at right angles to 212 of FIG. 2), the polarization states of the red light, the green light, and the blue light passing through the first polarizer 210 will be disposed at positions separated from the prime meridian of the Poincare surface in the right side according to the transmissive preference for the second coordinate-axis S2. As a result, the corresponding extinction point (diamond icon) is disposed at an equatorial position separated from the prime meridian of the Poincare surface on its left side.

Next, if the red light, green light, and blue light transmitted through the first polarizer 210 are then transmitted through the C-plate 210, the polarization states of the colored lights are rotated so as to be disposed below the Equator by a first distance relative to the adjacent prime meridian (which is parallel to the third coordinate-axis S3). Here, the phase retardations of each of the R, G, B colored lights after passing through the C-plate 210 are different per their wavelengths such that the polarization states thereof may be dispersed as shown in FIG. 5. Green (upright triangle) is the central wavelength.

Figure 6:
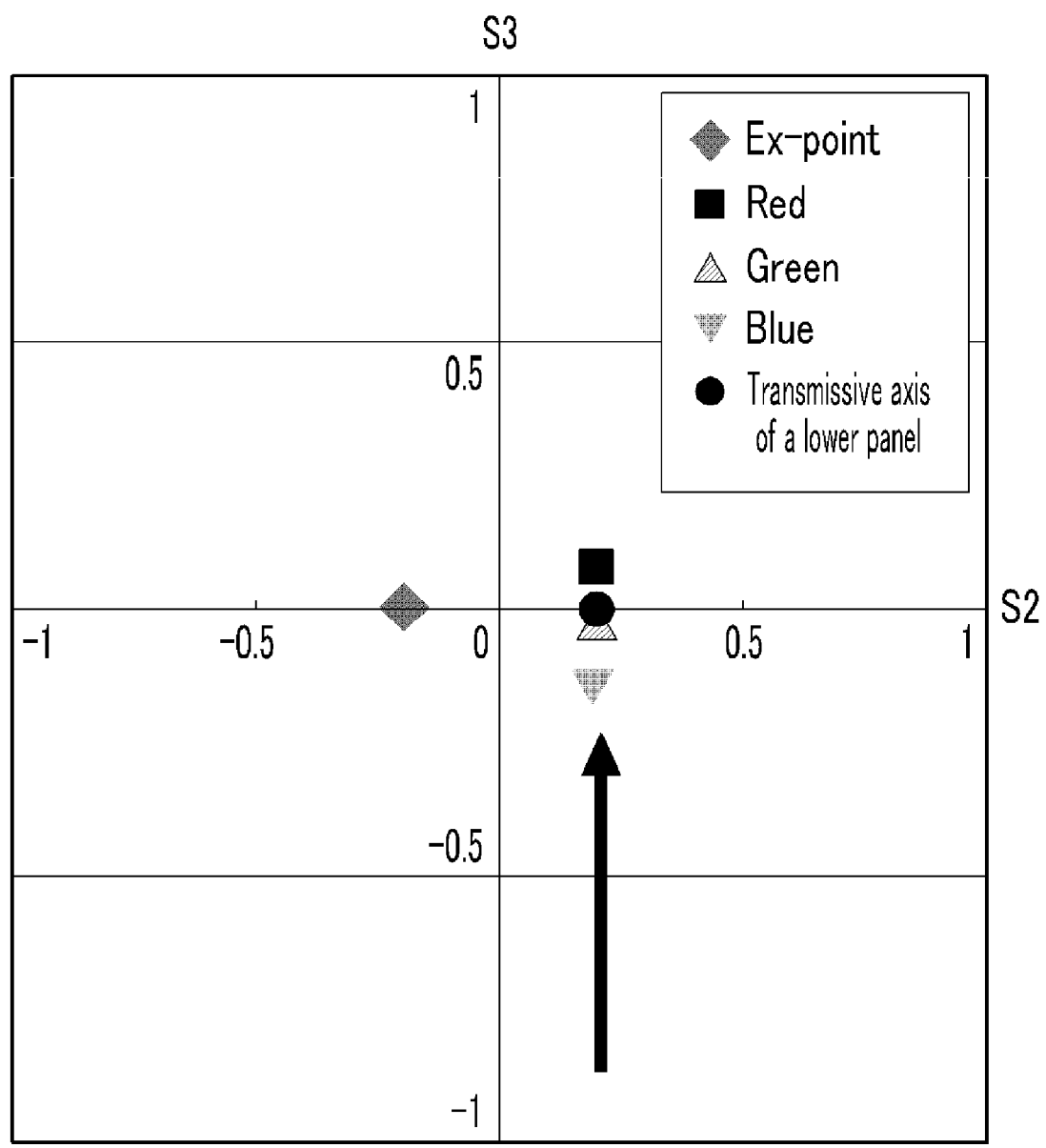
FIG. 6 is a plan view of the front spherical surface of the Poincare sphere showing what happens to polarization states after the C-Plate processed light next passes through the VAM liquid crystal layer in FIG. 2.

FIG. 6 is a front plan view of the Poincare spherical surface when representing polarization states after next transmitting through the liquid crystal layer of FIG. 2 and FIG. 3.

Referring to FIG. 2, FIG. 3, and FIG. 6, after transmitting through the C-plate 220, the red light, the green light, and the blue light are then transmitted through the liquid crystal layer 130. The polarization states of the colored lights that are transmitted through the liquid crystal layer 130 are counter-wise rotated back up as shown in FIG. 6 so as to be disposed by the second distance relative to the prime meridian (or the third coordinate-axis S3). Here, the second translation distance may be slightly larger than the first translation distance of FIG. 5. Accordingly, the polarization states of the colored lights that are transmitted through the liquid crystal layer 130 may be disposed more so on the upper hemisphere portion of the graph of FIG. 6 and with reference to the second coordinate-axis S2. On the other hand, the polarization states of the colored light may be yet further dispersed relative to one another than when transmitted just through the C-plate 220.

Figure 7:
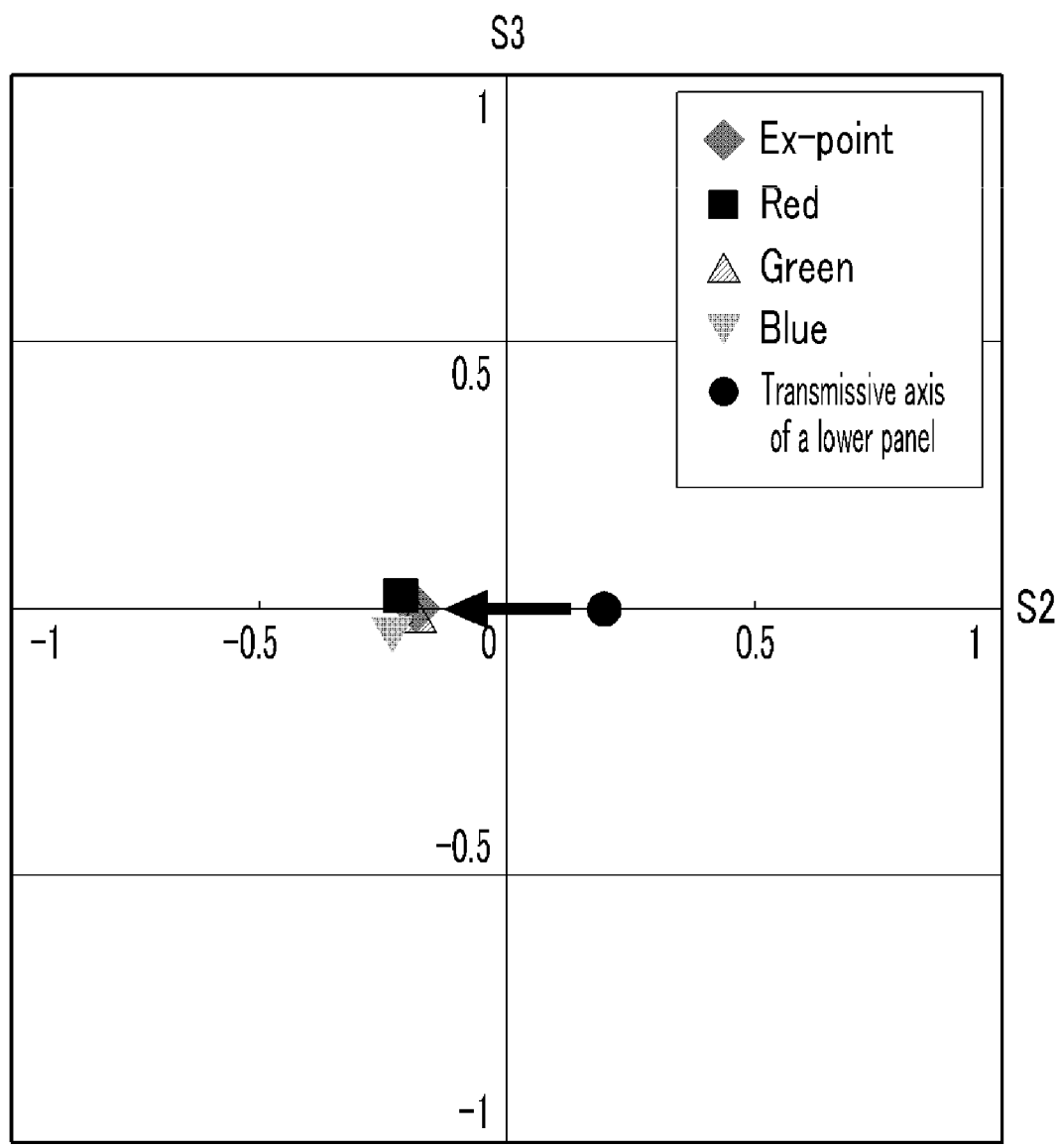
FIG. 7 is a plan view of the front spherical surface of the Poincare sphere showing what happens to polarization states after the colored light rays next pass through the biaxial compensation plate (or film) of FIG. 2.

FIG. 7 is a front plan view of the Poincare spherical surface when representing a resultant polarization states of the respective R, G, B light rays after next transmitting through the biaxial compensation plate 320 of FIG. 2.

Referring to FIG. 7, recall that after red light, green light, and blue light are transmitted through the liquid crystal layer 130, they are then transmitted through the color filters 122. The color filters 122 each selectively transmits one of the red light, the green light, and the blue light as its primary wavelength.

The red light, the green light, and the blue light that are respectively transmitted through the color filter 122 are then next transmitted through the biaxial compensation plate 320. The polarization states of the colored lights transmitted respectively through the biaxial compensation plate 320 are moved (translated) as shown in FIG. 7 by the third distance towards the left side relative to the prime meridian (or second coordinate-axis S2) and thus disposed close to the extinction point (diamond icon). Accordingly, due to the translation provided sequentially in FIGS. 5, 6 and 7, the dispersed polarization states of the colored lights may be re-gathered around the extinction point when the VAM liquid crystal layer is in relaxed mode.

Figure 8:
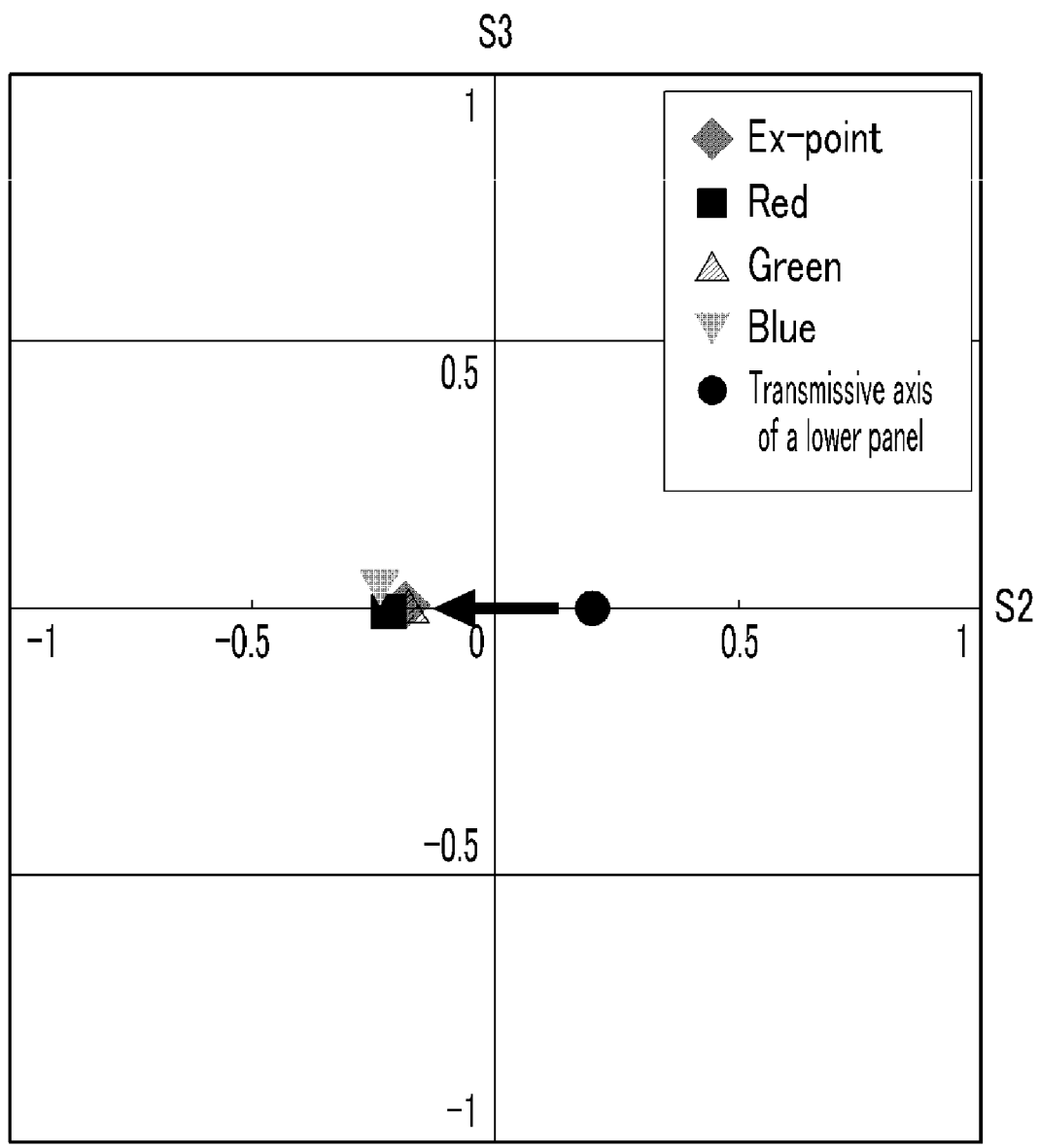
FIG. 8 is a plan view showing positions on a front spherical surface of the Poincare sphere after a colored light passes a biaxial compensation film in FIG. 3.

FIG. 8 is a front plan view of the Poincare spherical surface when representing the final polarization states of the R, G, B light rays after transmitting through the biaxial compensation plate of the alternate embodiment of FIG. 3.

More specifically, FIG. 8 represents the case where the biaxial compensation plate 320 of FIG. 2 is replaced by the differently oriented biaxial compensation plate 320' of FIG. 3. In FIG. 8, the final polarization states of the colored lights transmitted through the biaxial compensation plate 320' are moved by the fourth distance and into the left side of the prime meridian (which is parallel to the second coordinate-axis S2), and thus once again disposed close to the extinction point (diamond icon). Here, the fourth distance may be the same as the third distance. On the other hand, the polarization states of the dispersed colored lights in FIG. 8 may be gathered closer to one another than in FIG. 7, this depending on the specifics of the optical members used and the better of the embodiment choices of FIG. 2 and FIG. 3 may be empirically determined on a case by case basis.

As described above, when observing the display device on the side, the biaxial compensation plate 320 may cause a gathering around the extinction point of the polarization states of the red light, the green light, and the blue light that had been dispersed by the C-plate 220 and by the liquid crystal layer 130. Accordingly, the bright contrast ratio at the nominal side view of the display device may be improved with this polarization states control method as compared to VAM Liquid Crystal Displays (LCDs) that do not employ the here described polarization states control method.

Figure 9:
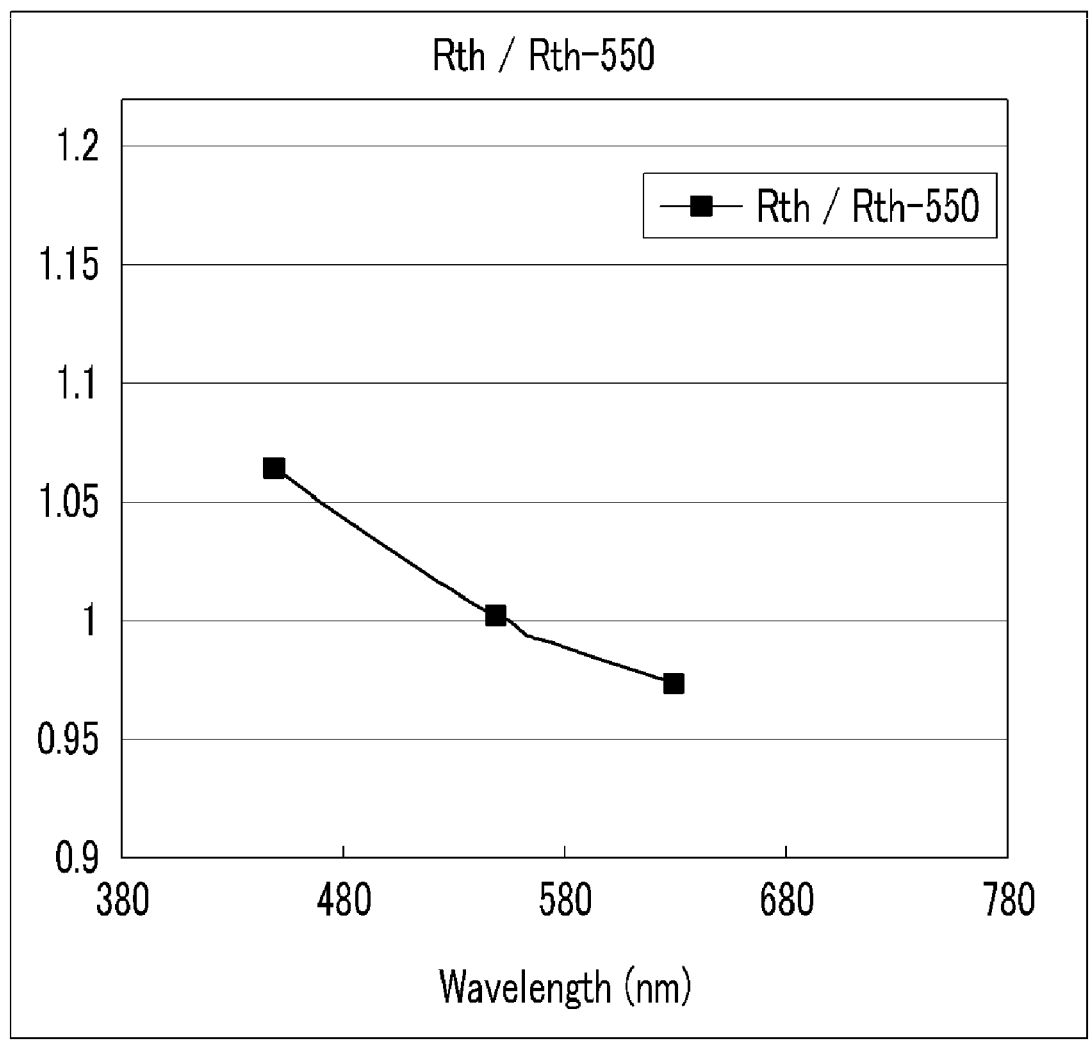
FIG. 9 to FIG. 11 are respective graphs showing a dispersion characteristic of three different C-plate embodiments (#1, #2, #3) used as exemplary embodiments of the present disclosure.
Figure 10:
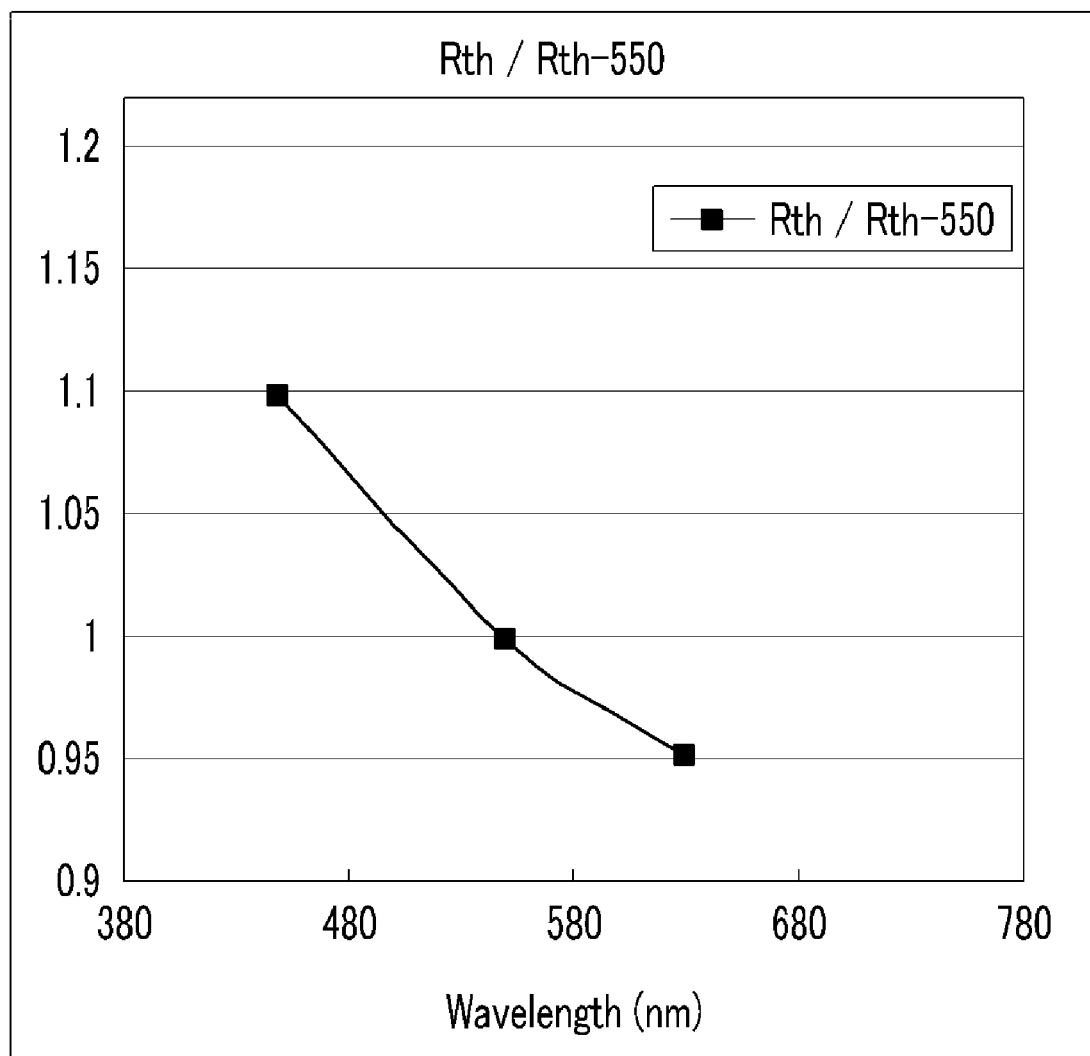
Figure 11:
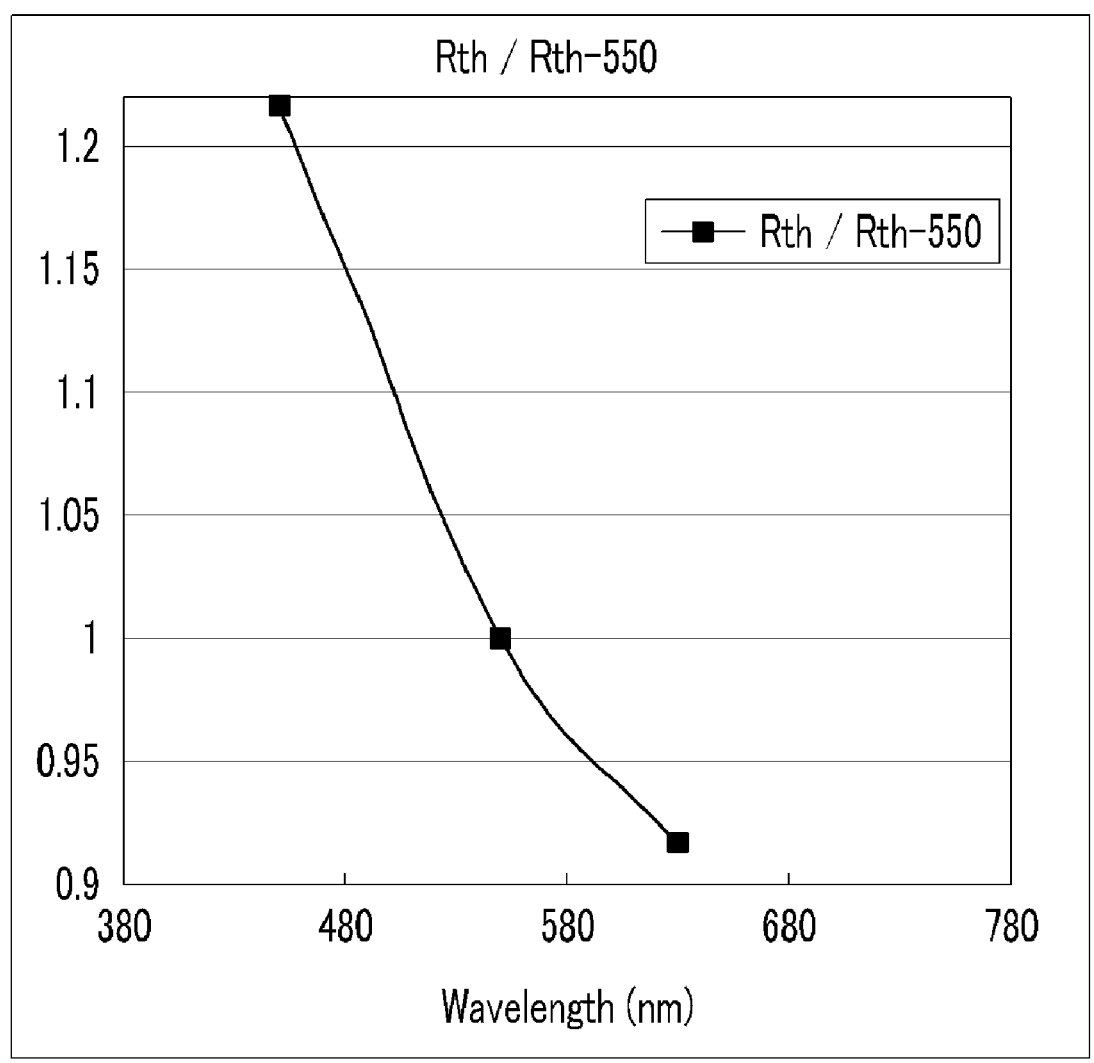
Figure 12:
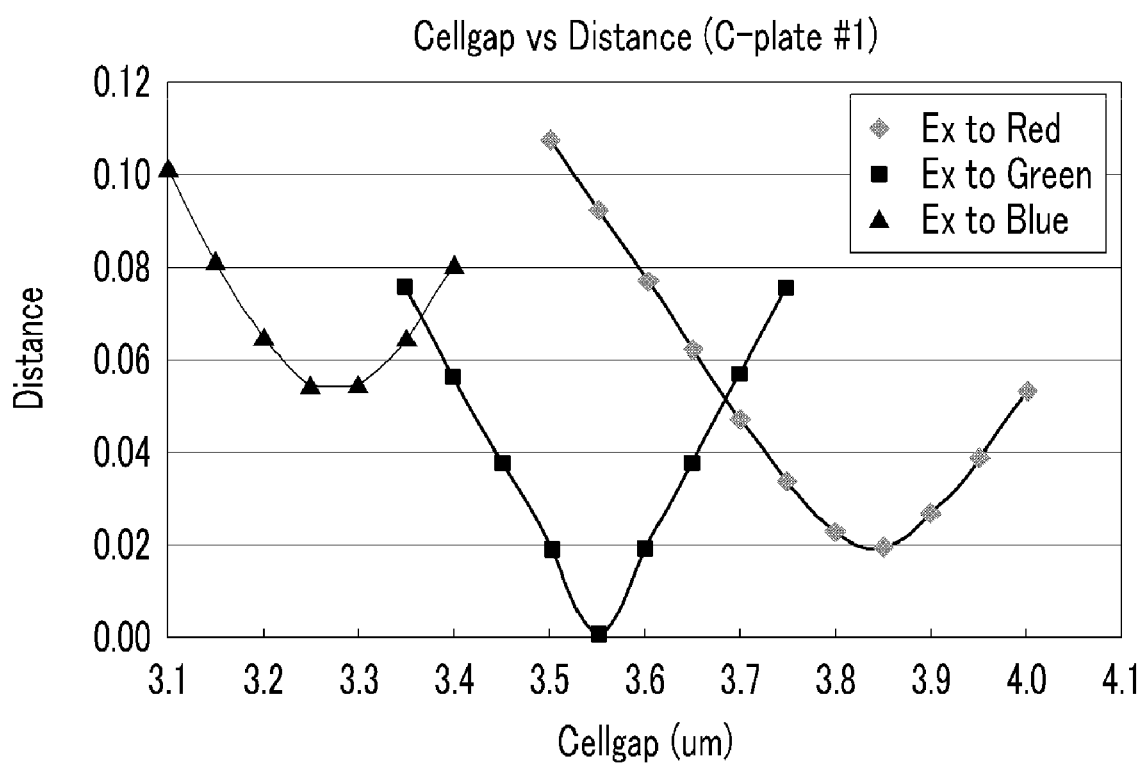
FIG. 12 to FIG. 14 are respective graphs showing how a changed cell gap dimension versus distance affects an extinction polarization state of colored lights (R, G, B) in the respective three different C-plate embodiments (#1, #2, #3) of respective FIGS. 9-11
Figure 13:
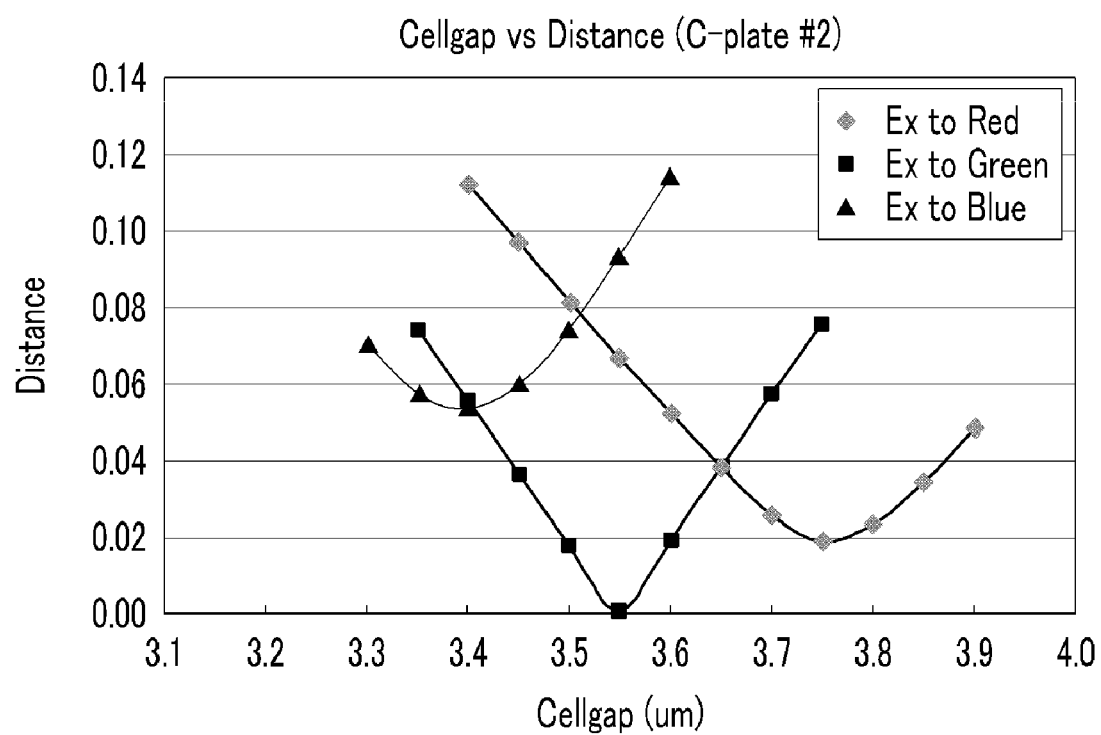
Figure 14:
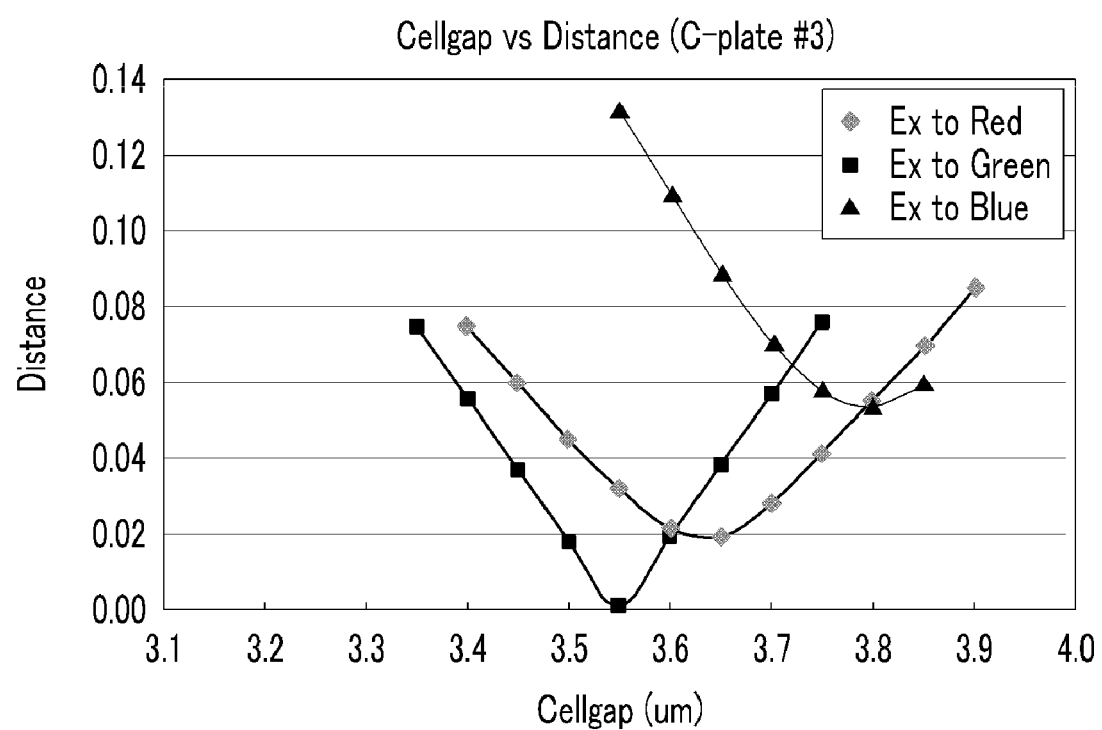

FIG. 9 to FIG. 11 are graphs showing normalized dispersion characteristic of three C-plates used in an exemplary embodiments and identified respectively as C-plate #1, #2 and #3. FIG. 12, FIG. 13, and FIG. 14 are graphs showing a distance relationship between a polarization state of a colored light and an extinction point on the Poincare surface as a function of changed thickness (cell gap) of the liquid crystal layer, where the goal is to minimize the dispersions of polarization states for the different wavelengths when also using a respective C-plate (#1, #2 or #3) having a wavelength dispersion characteristic of respective FIG. 9 to FIG. 11 as a uniaxial compensation film as a lower panel for FIG. 2, respectively.

TABLE 1

|  |  | R | G | B |
|---|---|---|---|---|
| C-plate #1 | Rth of a liquid crystal | 320.3 | 303.2 | 302.6 |
|  | Rth of a C-plate | 280.1 | 288.0 | 306.4 |
|  | Difference = Rth of a liquid crystal – Rth of a C-plate | 40.2 | 15.2 | –3.8 |
| C-plate #2 | Rth of a liquid crystal | 312.0 | 303.2 | 311.8 |
|  | Rth of a C-plate | 267.2 | 280.9 | 308.3 |
|  | Difference = Rth of a liquid crystal – Rth of a C-plate | 44.8 | 22.3 | 3.5 |
| C-plate #3 | Rth of a liquid crystal | 303.7 | 303.2 | 348.5 |
|  | Rth of a C-plate | 258.8 | 282.4 | 343.2 |
|  | Difference = Rth of a liquid crystal – Rth of a C-plate | 44.8 | 20.8 | 5.2 |

Table 1 above shows the thickness direction phase retardations (in terms of nanometers) of a liquid crystal, phase retardation of a respective C-plate (#1, #2 and #3), and the difference between the phase retardation of the liquid crystal and the phase retardation of the C-plate per a red color, a green color, and a blue color when applying a cell gap having a distance closest to an extinction point to a red, a green, and a blue pixel in FIG. 12, FIG. 13, and FIG. 14. As mentioned, the phase units of the above Table 1 is in nm, and Rth of the liquid crystal is the phase retardation measured at 40° C.

In the above Table 1, the difference value resulting from the phase retardation of the C-plate that is being subtracted from the phase retardation of the liquid crystal may be more generally and respectively in the range of about 30-50 nm for the red light, about 5-25 nm for the green light, and about –15 to +10 nm for the blue light. These ranges limit the optimized phase difference combinations that may be used per the wavelengths, and when the difference is less or more than these range values, the amount of lateral light leakage may be undesirably increased.

As shown in FIG. 12, FIG. 13, and FIG. 14, with reference to the green light, when the thickness of the liquid crystal layer is 3.55 nm, it may be confirmed that the distances between the dispersed polarization states of each of the colored lights and the extinction point are closest to each other.

As shown in Table 1, in the structure in FIG. 2, the value of the difference expression: [Rth of the liquid crystal–Rth of the C plate] has the condition of R 630 nm>G 550 nm>B 450 nm according to the wavelength.

Table 2 below shows phase retardation of a liquid crystal, phase retardation of a C-plate, and the difference between the phase retardation of the liquid crystal and the phase retardation of the C-plate per a red color, a green color, and a blue color when by using the C-plate having the wavelength dispersion characteristics of FIG. 9 to FIG. 11 as the uniaxial compensation film as the lower panel for FIG. 3, and applying a cell gap having a distance closest to an extinction point to a red, a green, and a blue pixel.

TABLE 2

|  |  | R | G | B |
|---|---|---|---|---|
| C-plate #1 | Rth of a liquid crystal | 270.4 | 303.2 | 348.5 |
|  | Rth of a C-plate | 275.8 | 283.6 | 301.7 |
|  | Difference = Rth of a liquid crystal – Rth a C-plate | –5.4 | 19.6 | 46.7 |
| C-plate #2 | Rth of a liquid crystal | 262.1 | 303.2 | 357.6 |
|  | Rth of a C-plate | 263.3 | 276.8 | 303.8 |
|  | Difference = Rth of a liquid crystal – Rth of a C-plate | –1.2 | 26.4 | 53.8 |
| C-plate #3 | Rth of a liquid crystal | 253.8 | 303.2 | 394.3 |
|  | Rth of a C-plate | 255.4 | 278.6 | 338.7 |
|  | Difference = Rth of a liquid crystal – Rth of a C-plate | –1.6 | 24.6 | 55.7 |

An unit of the above Table 2 is nm, and Rth of the liquid crystal is the phase retardation at 40° C.

In the above Table 2, the difference value of the phase retardation of the C-plate being subtracted from the phase retardation of the liquid crystal may be respectively in the range of –15-5 nm for the red light, 10-30 nm for the green light, and 35-60 nm for the blue light. These limit the optimized phase difference combination per the wavelengths, and when the difference is less or more than the value, the lateral light leakage may be increased.

As shown in Table 2, in the structure in FIG. 3, the value of the difference expression: [Rth of the liquid crystal–Rth of the C plate] has the condition of B 450 nm>G 550 nm>R 630 nm according to the respective wavelengths.

According to the present exemplary embodiments, when observing the display device at the nominal side view position, the polarization states of the red light, the green light, and the blue light transmitted through the C-plate 220 and the liquid crystal layer 130 are not necessarily joined and may be slightly dispersed. However, the biaxial compensation plate 320 (or 320') may gather the polarization states of the dispersed colored lights sufficiently close to the extinction point that a good black color state is perceived.

Accordingly, the polarization states of the colored lights may be substantially gathered into the extinction point on the Poincare sphere surface by use of an appropriately structured biaxial compensation plate 320, and thereby the brightness contrast ratio may be further improved when observing at the nominal side view position of the display device and the lateral viewing angle may be thus improved.

While inventive concepts have been described in connection with what are presently considered to be practical exemplary embodiments, it is to be understood that the present teachings are not limited to the disclosed embodiments, but, on the contrary, they are intended to cover various modifications and equivalent arrangements included within the spirit and scope of the teachings.

What is claimed is:

1. A display device comprising:
    a display panel including a first substrate, a second substrate facing the first substrate, and a liquid crystal layer interposed between the first substrate and the second substrate, where the liquid crystal layer is driven in a vertical alignment mode;
    a first optical unit including a C-plate and a first polarizer, where the first polarizer has a corresponding first absorption axis extending in an x axis direction among orthogonal x, y and z axes; and
    a second optical unit including a biaxial compensation plate having a refractive indices relationship of nx>nz>ny and a second polarizer, where the second polarizer has a corresponding second absorption axis extending in the y axis direction.

2. The display device of claim 1, wherein
the first optical unit is disposed in the front of the display panel with respect to a progressing direction of light, and
the second optical unit is disposed in the back of the display panel with respect to a progressing direction of light.

3. The display device of claim 1, wherein
the first optical unit is disposed in the back of the display panel with respect to a progressing direction of light, and
the second optical unit is disposed in the front of the display panel with respect to a progressing direction of light.

4. The display device of claim 1, wherein
the C-plate is disposed between the display panel and the first polarizer, and
the biaxial compensation plate is disposed between the display panel and the second polarizer.

5. The display device of claim 4, wherein
the biaxial compensation plate defines a phase retardation layer having an in-plane phase retardation Ro of 270-280 nm such as may be useful for a central green light wavelength of 550 nm,
wherein $Ro=(nx-ny)*d$, and d is a thickness of the biaxial compensation plate.

6. The display device of claim 5, wherein
an Nz coefficient value of the biaxial compensation plate is in the range of 0.45-0.55,
wherein $Nz=(nx-nz)/(nx-ny)$.

7. The display device of claim 4, wherein
the C-plate is a negative C-plate satisfying a condition of $nx=ny>nz$.

8. The display device of claim 4, wherein
the optical axis of the C-plate is parallel to the light progressing direction, and the optical axis of the biaxial compensation plate crosses orthogonally with one of the first and second absorption axes.

9. The display device of claim 8, wherein
a difference between a thickness direction phase retardation factor, Rth of the liquid crystal layer and corresponding phase retardation factor Rth of the C-plate for the blue light wavelength is equal to or less than a difference between phase retardation Rth of the liquid crystal layer and phase retardation of the C-plate for the green wavelength, and
a difference G between phase retardation Rth of the liquid crystal layer and phase retardation of the C-plate for the green light wavelength is equal to or less than a difference R between phase retardation Rth of the liquid crystal layer and phase retardation of the C-plate for the red wavelength.

10. The display device of claim 9, wherein
a difference value of the phase retardation Rth of the C-plate being subtracted from the phase retardation Rth of the liquid crystal layer for the red wavelength is in the range of 30-50 nm,
wherein $Rth=\{(nx+ny)/2-nz\}*d$, and d is a thickness of the corresponding plate, film or a layer.

11. The display device of claim 9, wherein
a difference value of the phase retardation Rth of the C-plate being subtracted from the phase retardation Rth of the liquid crystal layer for the green wavelength is in the range of 5-25 nm.

12. The display device of claim 9, wherein
a difference value of the phase retardation Rth of the C-plate being subtracted from the phase retardation Rth of the liquid crystal layer for the blue wavelength is in the range of −15-10 nm.

13. The display device of claim 4, wherein
the optical axis of the C-plate is parallel to the light progressing direction, and the optical axis of the biaxial compensation plate is parallel to the second absorption axis.

14. The display device of claim 13, wherein
a difference between phase retardation Rth of the liquid crystal layer and phase retardation Rth of the C-plate for the blue light wavelength is equal to or more than a difference between phase retardation Rth of the liquid crystal layer and phase retardation of the C-plate for the green wavelength, and
a difference G between phase retardation Rth of the liquid crystal layer and phase retardation of the C-plate for the green light wavelength is equal to or more than a difference R between phase retardation Rth of the liquid crystal layer and phase retardation of the C-plate for the red wavelength.

15. The display device of claim 14, wherein
a difference value of the phase retardation Rth of the C-plate being subtracted from the phase retardation Rth of the liquid crystal layer for the red wavelength is in the range of −15-5 nm.

16. The display device of claim 14, wherein
a difference value of the phase retardation Rth of the C-plate being subtracted from the phase retardation Rth of the liquid crystal layer for the green wavelength is in the range of 10-30 nm.

17. The display device of claim 14, wherein
a difference value of the phase retardation Rth of the C-plate being subtracted from the phase retardation Rth of the liquid crystal layer for the blue wavelength is in the range of 35-60 nm.

18. The display device of claim 1, wherein
the biaxial compensation film substantially accords the polarization states of the red light, green light, and blue light dispersed by the C-plate and the liquid crystal layer when observing the display panel at the side into the extinction point in a Poincare sphere.

* * * * *